J. S. Coen,
Corn Planter.
No. 85,563. Patented Jan. 5, 1869.

Witnesses:
Wm. A. Morgan
G. C. Cotton

Inventor:
J. S. Coen
Per Mummy
Attorney

United States Patent Office.

JAMES S. COEN, OF ATTICA, INDIANA.

Letters Patent No. 85,563, dated January 5, 1869.

IMPROVEMENT IN CORN-PLANTERS.

The Schedule referred to in these Letters Patent and making part of the same.

*To all whom it may concern:*

Be it known that I, JAMES S. COEN, of Attica, in the county of Fountain, and State of Indiana, have invented a new and useful Improvement in Corn-Planters; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a new and improved machine for planting corn; and

It consists in a peculiar construction of the frame of the machine and its working-parts, as hereinafter fully shown and described, whereby several advantages are obtained, as will be hereinafter set forth.

In the accompanying sheet of drawings—

A represents a bar, into the centre of which the rear end of the draught-pole B is framed, at right angles; and C is a semicircular bar, which forms the front part of the machine, the draught-pole being secured by a bolt, $a$, to an upright piece, $b$, on the centre of the semicircular bar.

The ends of the semicircular bar C are secured to the ends of the bar A, and to the inner side of C, near each end and in front of A, there are secured bars or strips, $c\ c$, the inner surfaces of which are parallel with each other.

To these surfaces of $c\ c$ the furrow-openers D D are attached, the same being constructed of sheet or roller metal, curved or rounded at their front ends, and having their rear ends forked or divaricated, to form seed-conducting channels $d$, to convey or conduct the seed, as discharged, to the furrows made by D D.

On the ends of the bar A the hoppers E E are secured, and through these hoppers the ends of a shaft, F, pass.

Figure 3:
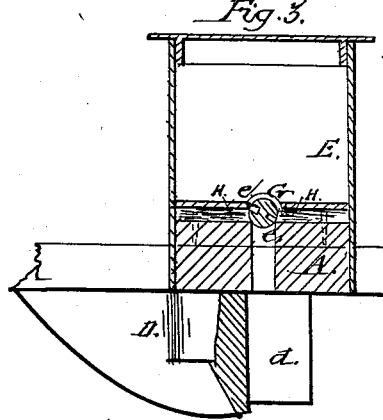
Figure 3 is an enlarged side sectional view of one of the hoppers and its seed-discharging device.
Figure 4:
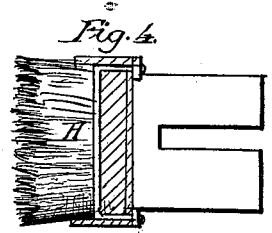
Figure 4 is an enlarged detached plan or top view of one of the cut-off brushes pertaining to the same.

On this shaft F, within the hoppers E, there are keyed cylinders G, in which holes or seed-cells $e\ e$ are made, at opposite points. (See fig. 3.)

These cylinders G G work between cut-off brushes H H, each hole filling with seed as it passes up between the two brushes, and discharging its seed as it passes down between the brushes.

The shaft F, where planting is done in hills, has a rotating movement given it, first in one direction and then in the other, by means of a band, I, which is attached to the shaft, and has its ends connected to a lever, J, which works on a shaft, K, the latter projecting from the dropper's seat.

In planting in drills, the shaft F is rotated by a belt, $a^\times$, or otherwise, continuously in one direction, from a shaft, L, which has two wheels, M M, placed loosely upon it.

These wheels are in line with the furrow-openers D D, and the shaft L has its bearings in the rear ends of a semicircular bar or lever, N, the fulcra of which are in the rear ends of the semicircular bar C, the front end of which rests on a spring, O, attached to the draught-pole B.

By this arrangement the wheels M M are kept down to their work, and made to act efficiently as coverers, the spring O yielding or giving, to admit of the wheels conforming to the inequalities of surface over which they may pass.

The driver's seat P is secured to the upper end of a bent rod, Q, which is supported by an upright, R, from the shaft L, and has its front end connected, by a joint, to a rod, S, which is attached to the draught-pole. This bent rod Q passes through oblong slots in plates $a'$ and $b'$, which confine the frame of the dropper's seat.

Figure 1:
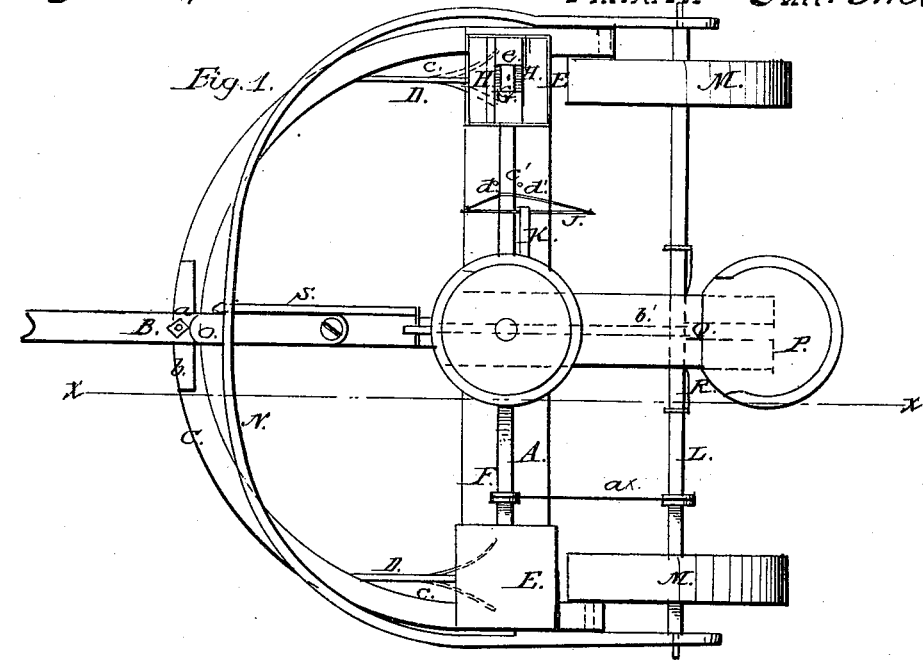
Figure 1 is a plan or top view of my invention.
Figure 2:
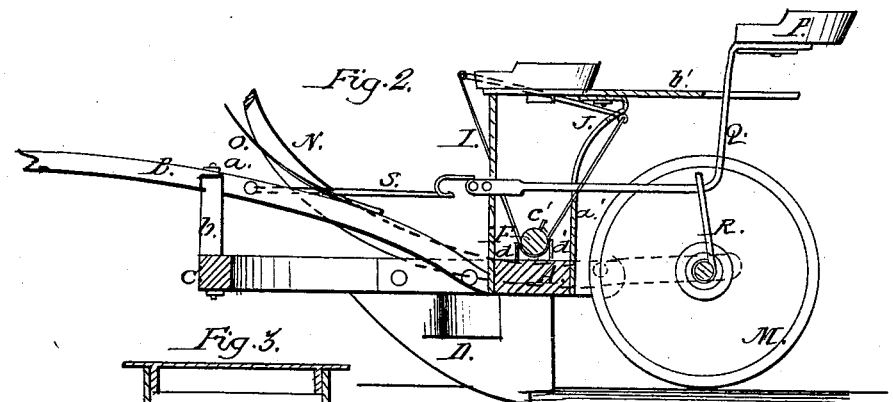
Figure 2 is a side sectional view of the same, taken in the line $x\ x$, fig. 1.

In giving the shaft F a reciprocating movement, the movement is limited by a pin or screw, $c'$, in the shaft, coming in contact with pins $d'$ in the bar A, as shown clearly in fig. 2.

By this arrangement a very strong and durable machine is obtained, and one which may be economically constructed.

I do not claim the seed-distributing cylinders, for they have been previously used; but having thus described my invention,

I claim as new, and desire to secure by Letters Patent—

1. The semicircular bar C, straight bar A, and draught-pole B, fitted together and combined with the wheels M M, semicircular bar or lever N, and spring O, all combined and arranged substantially in the manner as and for the purpose set forth.

2. Operating the shaft F, through the media of the lever J and band I, in connection with the stops $c'\ d'\ d'$, substantially as shown and described.

JAMES S. COEN.

Witnesses:
JAMES BUCHANAN,
JACOB C. DICK.